(12) United States Patent
Jiang et al.

(10) Patent No.: US 12,614,990 B2
(45) Date of Patent: Apr. 28, 2026

(54) HIGH-POWER FOUR-QUADRANT CONVERTER SYSTEM

(71) Applicant: HEFEI INSTITUTE OF PHYSICAL SCIENCE, CHINESE ACADEMY OF SCIENCES, Hefei (CN)

(72) Inventors: Li Jiang, Hefei (CN); Jie Zhang, Hefei (CN); Zhengyi Huang, Hefei (CN); Xuesong Xu, Hefei (CN); Peng Wu, Hefei (CN)

(73) Assignee: HEFEI INSTITUTE OF PHYSICAL SCIENCE, CHINESE ACADEMY OF SCIENCES, Hefei (CN)

( * ) Notice: Subject to any disclaimer, the term of this patent is extended or adjusted under 35 U.S.C. 154(b) by 224 days.

(21) Appl. No.: 18/732,675

(22) Filed: Jun. 4, 2024

(65) Prior Publication Data

US 2024/0322705 A1 Sep. 26, 2024

Related U.S. Application Data

(63) Continuation of application No. PCT/CN2023/141422, filed on Dec. 25, 2023.

(30) Foreign Application Priority Data

Dec. 29, 2022 (CN) .......................... 202211705381.4

(51) Int. Cl.
*H02M 7/162* (2006.01)
*H02M 7/00* (2006.01)
(52) U.S. Cl.
CPC ........... *H02M 7/162* (2013.01); *H02M 7/003* (2013.01)

(58) Field of Classification Search
None
See application file for complete search history.

(56) References Cited

U.S. PATENT DOCUMENTS

2005/0013147 A1* 1/2005 Villablanca ............. H02M 1/15
363/44

FOREIGN PATENT DOCUMENTS

CN 1045493 A * 9/1990 ............ H02M 7/219
CN 1567691 A * 1/2005
(Continued)

*Primary Examiner* — Ryan Johnson
*Assistant Examiner* — Aqeel H Bukhari
(74) *Attorney, Agent, or Firm* — Bayramoglu Law Offices LLC

(57) ABSTRACT

A high-power four-quadrant converter system includes a double-secondary-side oil-immersed rectifier transformer with an output connected to four three-phase bridge type thyristor rectifiers, wherein every two rectifier bridges share a group of rectifier transformer secondary sides; two rectifier bridges sharing a group of rectifier transformer secondary sides are inversely connected in parallel, one of the two rectifier bridges realizes a forward output, and the other one realizes a reverse output; two groups of rectifier bridges which output in the same direction can operate independently or in parallel; when the two groups of rectifier bridges operate in parallel, reactors are connected in parallel to realize current sharing; and the rectifier bridges for the forward output and the reverse output realize free smooth transition under control of a controller, so that a four-quadrant operation of an output current is realized. When the system operates, the electromagnetic compatibility of sensitive components is high.

8 Claims, 5 Drawing Sheets

Parameters of converter bridges（CU1-C1、CU1-C2、CU2-C1和CU2-C2）are all：
1.42kV、27.5kA。Dummy load：5mH、2.5mΩ或2.5mH、1.25mΩ或1.25mH、
0.625mΩ。Bypass：Rated Voltage1.42kV、Rated current 55kA。

(56)  References Cited

FOREIGN PATENT DOCUMENTS

| CN | 201440640 U | | 4/2010 |
| CN | 101908828 A | * | 12/2010 |
| CN | 211151846 U | | 7/2020 |
| CN | 115940665 A | | 4/2023 |
| EP | 0621679 A1 | | 10/1994 |

* cited by examiner

Parameters of converter bridges（CU1-C1、CU1-C2、CU2-C1和CU2-C2）are all:
1.42kV，27.5kA。Dummy load：5mH，2.5mΩ或2.5mH，1.25mΩ或1.25mH，
0.625mΩ。Bypass：Rated Voltage1.42kV，Rated current 55kA。

HIGH-POWER FOUR-QUADRANT CONVERTER SYSTEM

CROSS REFERENCE TO THE RELATED APPLICATIONS

This application is the continuation application of International Application No. PCT/CN2023/141422, filed on Dec. 25, 2023, which is based upon and claims priority to Chinese Patent Application No. 202211705381.4, filed on Dec. 29, 2022, the entire contents of which are incorporated herein by reference.

TECHNICAL FIELD

The invention relates to the technical field of current rectifier system integration, and in particular, to a high-power four-quadrant converter system.

BACKGROUND

The current design method for large-current rectifier system integration is to use the traditional cophase counter parallel connection rectifier system integration technology, and this technology mainly requires that all rectifiers and smoothing reactors are integrated in parallel. Therefore, this system design occupies a large area and has poor electromagnetic compatibility.

According to the needs of poloidal field converters of the international cooperation big science research project ITER, a high-power rectifier that can maximally output a voltage of 1 kV and a direct current (DC) current of 60 kA while having four-quadrant operation capability is required to developed. This rectifier system needs to integrate all subsystems in a limited space, and the traditional method will definitely not be able to meet the system integration requirements. Therefore, a new method was designed to integrate the system, and the method was verified to be correct by mounting a rectifier system prototype.

SUMMARY

A high-power four-quadrant converter system according to the present invention can solve at least one of the foregoing technical problems.

To achieve the objectives, the following technical solutions are adopted in the present invention:

A high-power four-quadrant converter system includes a double-secondary-side oil-immersed rectifier transformer with an output connected to four three-phase bridge type thyristor rectifiers, wherein every two rectifier bridges share a group of rectifier transformer secondary sides;

two rectifier bridges sharing a group of rectifier transformer secondary sides are inversely connected in parallel, one of the two rectifier bridges realizes a forward output, and the other one realizes a reverse output;

two groups of rectifier bridges which output in the same direction can operate independently or in parallel; and when the two groups of rectifier bridges operate in parallel, reactors are connected in parallel to realize current sharing; and the rectifier bridges for the forward output and the reverse output realize free smooth transition under control of a controller, so that a four-quadrant operation of an output current is realized.

Furthermore, both an alternate current (AC) part and a direct current (DC) part are included, wherein the AC part includes a high-voltage cable terminal, AC isolation switches, a lightning arrester, a rectifier transformer, an AC bus, and high-voltage buses interconnected between equipment;

an AC high-voltage cable is connected to the rectifier transformer through the cable terminal, the AC isolation switches, and the lightning arrester; wherein the cable terminal, the AC isolation switches, and the lightning arrester are mounted on the same steel structure support member, and the steel structure support member additionally requires reliable multi-point grounding;

the DC part includes the rectifier bridges, a bypass cabinet, the reactors, the controller, and DC buses interconnected between the equipment; and the four rectifier bridges are connected to inputs of the reactors through DC water-cooling buses, and outputs of the reactors are connected in parallel and output through DC isolation switches.

Furthermore, a three-phase AC bus of the AC part must adopt a closed structure; and the AC bus requires a reliable electrical connection between three-phase shielding layers and single-point grounding.

Furthermore, reserved interfaces at both ends are included, which meet a scalable connection mode and serve as connection media for the AC part and the DC part.

Furthermore, a bypass cabinet used for system protection is included, wherein one end of the bypass cabinet is connected to the rectifier bridges through a soft connection, and the other end is connected to the rectifier bridges through a soft connection; the bypass cabinet is located in the middle of the four rectifier bridges; and a clearance from the rectifier bridges is not less than 800 mm.

Furthermore, the rectifier bridges include two rectifier bridges that share the rectifier transformer secondary sides, one rectifier bridge is named a forward bridge for the forward output, the other one is named a reverse bridge for the reverse output, and the forward bridge and the reverse bridge together become a rectifier unit; and the forward bridge and the reverse bridge that share the rectifier transformer secondary sides cannot work at the same time, and a clearance distance between the two groups of rectifier units cannot be less than 2 m.

Furthermore, there are two reactors arranged up and down with a clearance distance that is not less than 800 mm, and the upper reactor is fixed to the surface of the other reactor by using a nonmagnetic material.

Furthermore, the DC isolation switches are arranged up and down with a clearance distance that is not less than 1.5 m; and the DC isolation switches are fixed with a steel structure.

Furthermore, the DC buses are aluminum busbars with a cross-section of 200×60 mm, a middle limber hole thereof has a diameter of 20 mm, the aluminum busbars are fixed on a suspension beam through insulators, and the suspension beam is connected to a main steel structure through a screw.

Furthermore, a clearance distance between each control cabinet and the rectifier bridges is not less than 1 m; and a 200 mm channel steel is arranged under the control cabinet as a bracket to facilitate electrical connections between the control cabinets.

It can be seen from the foregoing technical solutions that, the high-power four-quadrant converter system of the present invention, and especially a system integration design of a non-cophase counter parallel connection rectifier with a single current exceeding 30 kA and a total current exceeding 100 kA, can particularly be applied in a current four-quadrant operation situation. The present invention avoids the defects of the traditional system integration method, saves mounting space, makes the system more compact and aesthetic, effectively fills the blank in the high-power rectifier system integration method based on the non-cophase counter parallel connection structure, and can be effectively applied in electrolytic aluminum, metallurgy and nuclear fusion experimental devices and other fields. According to the integration method of the present invention, a layout of system equipment is centrosymmetric, making mounting more convenient. According to the integration method of the present invention, all connections between the system equipment can be connected by bolts through soft connections, thereby avoiding serious local heating of equipment joints caused by poor welding processes. Because all joints are connected by bolts, the system can be conveniently disassembled and assembled, making it convenient for the equipment to be returned to factory for necessary maintenance and repairs.

In the present invention, precisely because the equipment is connected to each other through soft connections, a positioning deviation of main equipment can also be properly amplified. According to the integration method of the present invention, the layout of the system equipment is centrosymmetric, when the system operates, distribution of a magnetic field is also centrosymmetric, and a charged conductor at the centerline position suffers magnetic field forces that are equal in magnitude and opposite in direction. This reduces difficulties of subsequent design, processing and production of support structures. According to an integration method of the present invention, a layout of system equipment is centrosymmetric, and when the system operates, the electromagnetic compatibility of sensitive components is high. The distance between output busbars of the two rectifier bridges of the same rectifier unit can be very close, so that the mounting space is saved, and the stability of the support structure is improved.

1. Converter; 2. Bypass cabinet; 3. DC reactor; 4. DC isolation switch; 5. Control cabinet; 6. Water separator; 7. DC busbar; 8. Cable channel; 9. AC isolation switch; 10. Rectifier transformer; 11. Closed AC bus.

DETAILED DESCRIPTION OF THE EMBODIMENTS

In order to make objectives, technical solutions and advantages of embodiments of the present invention clearer, the technical solutions in the embodiments of the present invention will be clearly and completely described below in combination with the accompanying drawings in the embodiments of the present invention. Obviously, the described embodiments are only some of the embodiments of the present invention and not all of the embodiments.

Figure 1:
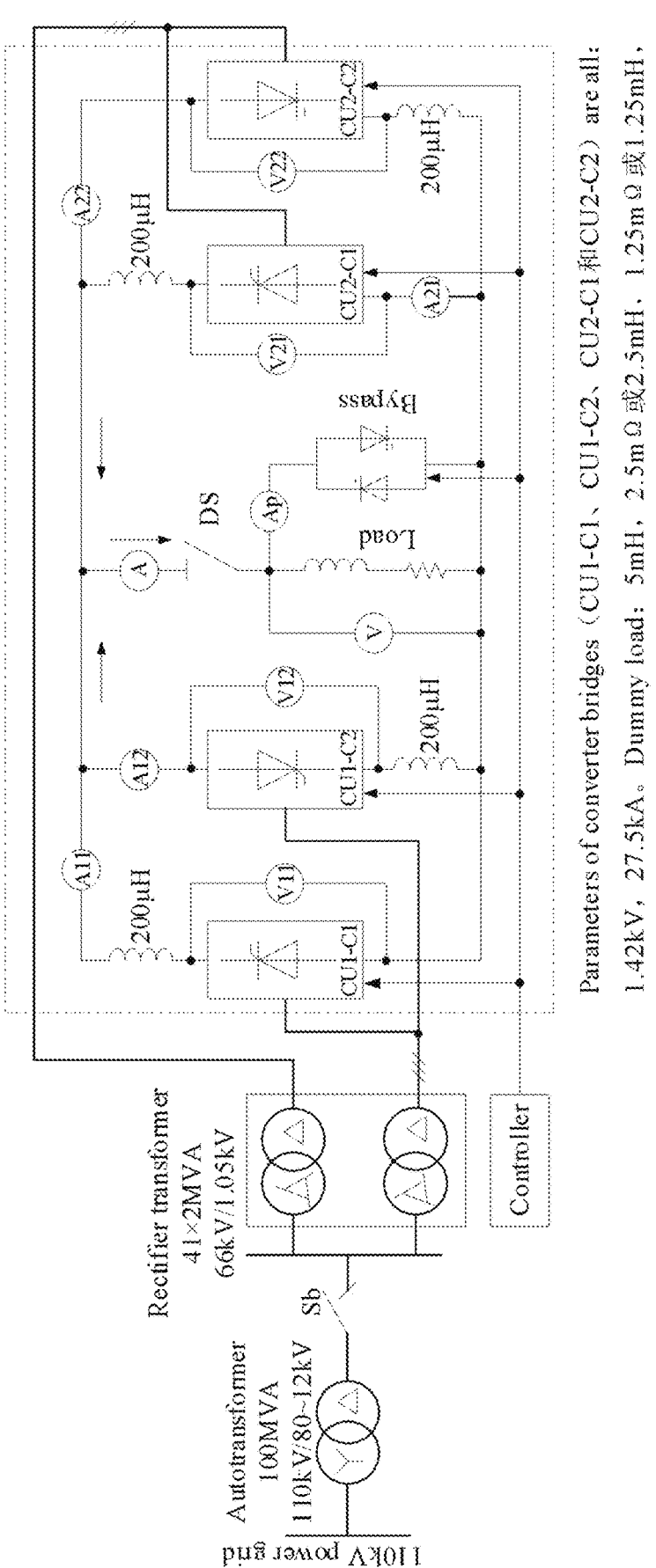
FIG. 1 is an electrical principle diagram according to the present invention.

As shown in FIG. 1, a high-power four-quadrant converter system in this embodiment includes a double-secondary-side oil-immersed rectifier transformer 10 (hereinafter referred to as a rectifier transformer) with an output connected to four three-phase bridge type thyristor rectifiers (hereinafter referred to as rectifier bridges) (CU1-C1, CU1-C2, CU2-C1, and CU2-C2 in FIG. 1), wherein every two rectifier bridges share a group of rectifier transformer secondary sides. (CU1-C1 and CU2-C2 share a group of secondary sides, and CU2-C1 and CU2-C2 share another group of secondary sides) To realize a four-quadrant operation, two rectifier bridges sharing a group of rectifier transformer secondary sides needs to be inversely connected in parallel, one of the two rectifier bridges (such as CU1-C1 and CU2-C1) realizes a forward output, and the other one (such as CU1-C2 and CU2-C2) realizes a reverse output. Two groups of rectifier bridges which output in the same direction (such as CU1-C1 and CU2-C1 or CU1-C2 and CU2-C2) can operate independently or in parallel. When the two groups of rectifier bridges operate in parallel, reactors (200 uH) must be connected in parallel to realize current sharing, thereby ensuring the reliable parallel operation. The rectifier bridges for the forward output and the reverse output (hereinafter referred to as a forward bridge or a reverse bridge) can realize free smooth transition under control of a controller, so that a four-quadrant operation of an output current can be realized.

Figure 2:
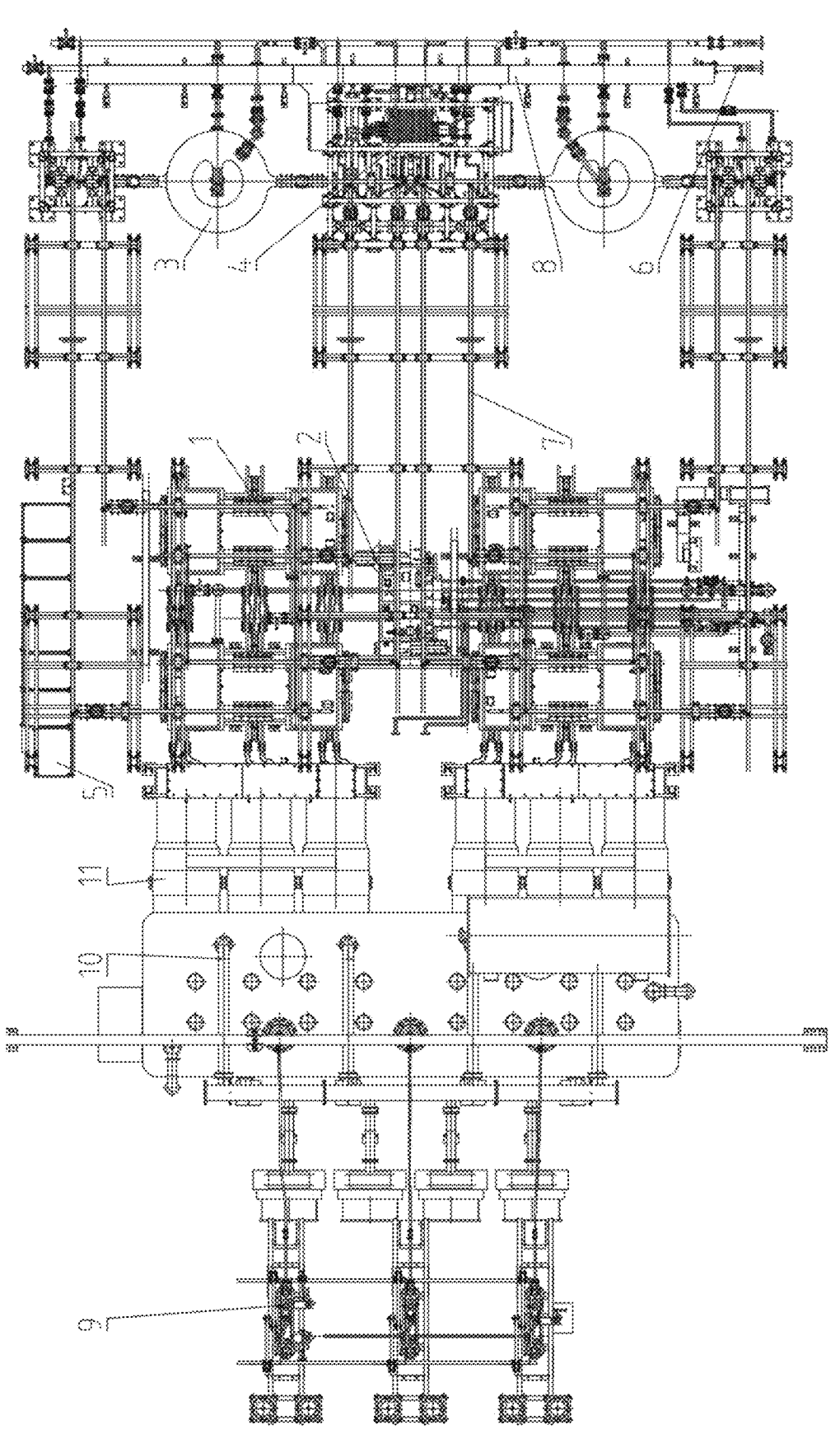
FIG. 2 is a schematic structural diagram from an overall top perspective according to the present invention.

As the following detailed descriptions, the specific implementations are as shown in FIG. 2:

The main component equipment involved in the present invention may be divided into an alternate current (AC) part and a direct current (DC) part, wherein the main component equipment of the AC part includes a high-voltage cable terminal, AC isolation switches 9, a lightning arrester, a rectifier transformer, an AC bus 11, and high-voltage buses interconnected between equipment. The main component equipment of the DC part includes the rectifier bridges, a bypass cabinet 2, DC reactors 3, the controller, and DC buses interconnected between the equipment.

Figure 3:
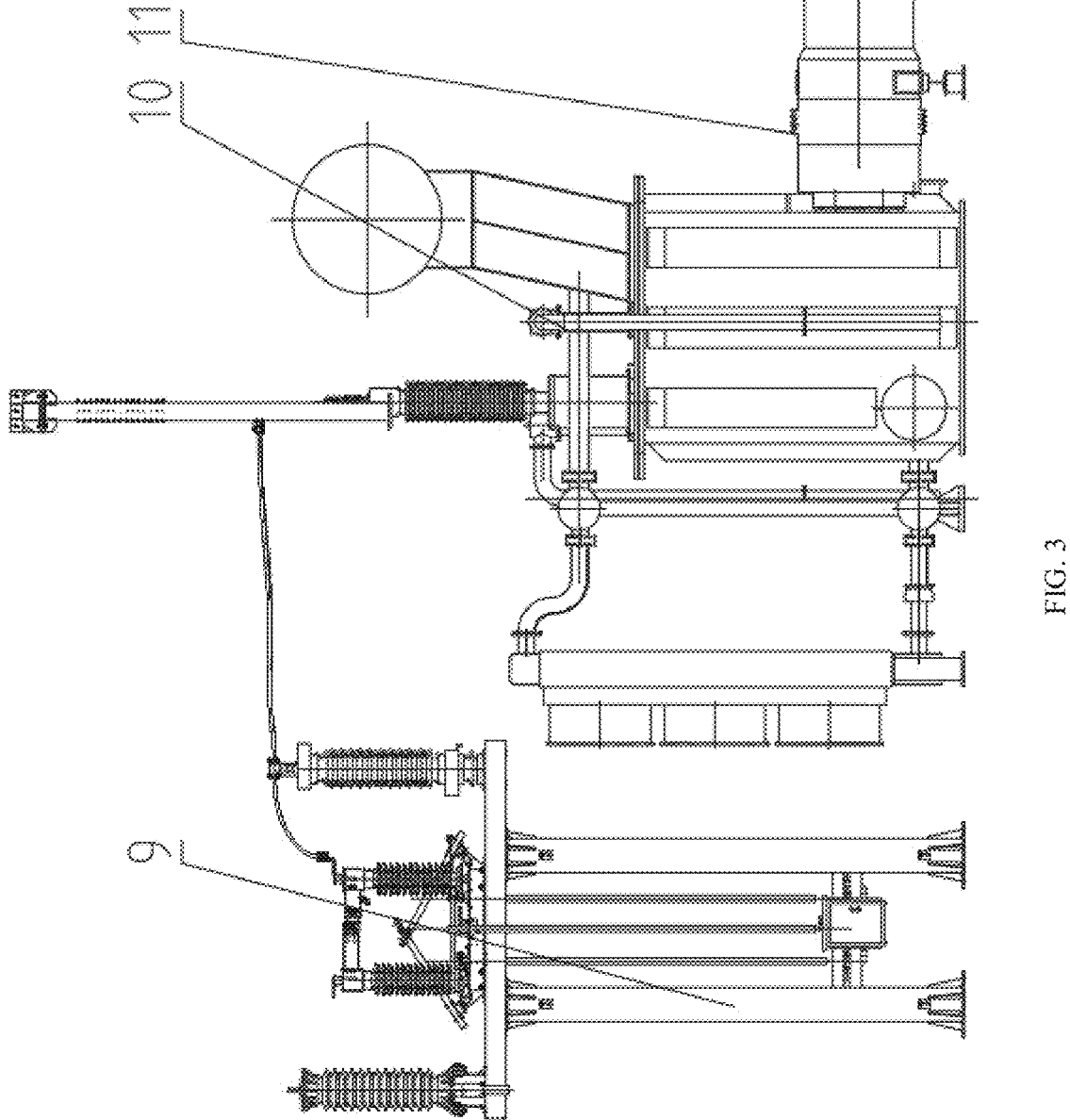
FIG. 3 is a schematic diagram from a main perspective of an alternate current (AC) side according to an embodiment of the present invention.

A system integration manner of the AC part is as shown in FIG. 3. An AC high-voltage cable is connected to the rectifier transformer through the cable terminal, the AC isolation switches, and the lightning arrester. The cable terminal, the AC isolation switches, and the lightning arrester are mounted on the same steel structure support member, and the steel structure support member additionally requires reliable multi-point grounding.

Because the high-power four-quadrant rectifier system is a non-cophase counter parallel connection system and needs to pass through a wall from outdoors to indoors, the three-phase AC bus must adopt a closed structure. At the same time, the AC bus requires a reliable electrical connection between three-phase shielding layers and single-point grounding. In addition, it is required to reserve interfaces at both ends, which meet a scalable connection mode and serve as connection media for the AC part and the DC part.

A system integration manner of the DC part is as shown in FIG. 3. The four rectifier bridges are connected to inputs of the reactors through DC water-cooling buses, and outputs of the reactors are connected in parallel and output through DC isolation switches 4. Because a load of the high-power four-quadrant rectifier system in the embodiment of the present invention is a large inductance load, the bypass cabinet 2 is added to the system used for system protection.

One end of the bypass cabinet 2 is connected to the rectifier bridge (CU1-C1) through a soft connection, and the other end is connected to the rectifier bridge (CU2-C1) through a soft connection. The bypass cabinet 2 is located in the middle of the four rectifier bridges. A clearance from the rectifier bridges is not less than 800 mm.

Figure 4:
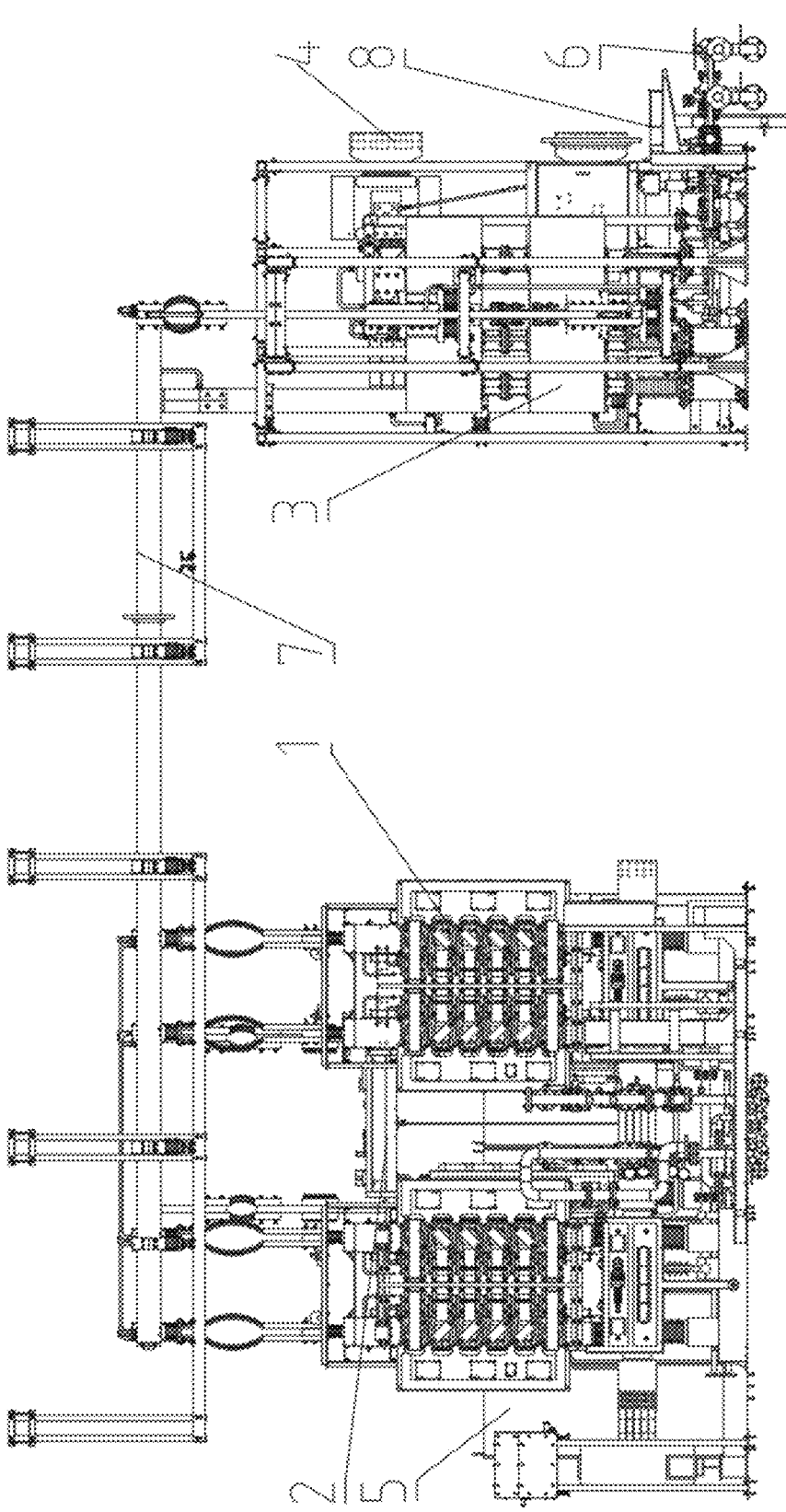
FIG. 4 is a schematic diagram from a main perspective of a direct current (DC) side according to an embodiment of the present invention.

A layout of the rectifier bridges is as shown in FIG. 4, there are two rectifier bridges that share the rectifier transformer secondary sides, one rectifier bridge is named the forward bridge for the forward output, and the other one is named the reverse bridge for the reverse output (the forward bridge and the reverse bridge together become a rectifier unit). The forward bridge and the reverse bridge that share the rectifier transformer secondary sides cannot work at the same time. A clearance distance between the two groups of rectifier units cannot be less than 2 m.

A layout of the reactors is as shown in FIG. 4, two reactors are arranged up and down with a clearance distance that cannot be less than 800 mm, and the upper reactor is fixed to the surface of the other reactor by using a nonmagnetic material. The DC isolation switches are arranged up and down with a clearance distance that is not less than 1.5 m. The DC isolation switches need to be fixed with a steel structure to improve stability.

The DC buses are aluminum busbars with a cross-section of 200×60 mm (a middle limber hole thereof has a diameter of 20 mm), the aluminum busbars are fixed on a suspension beam through insulators, and the suspension beam is connected to a main steel structure through a screw.

Figure 5:
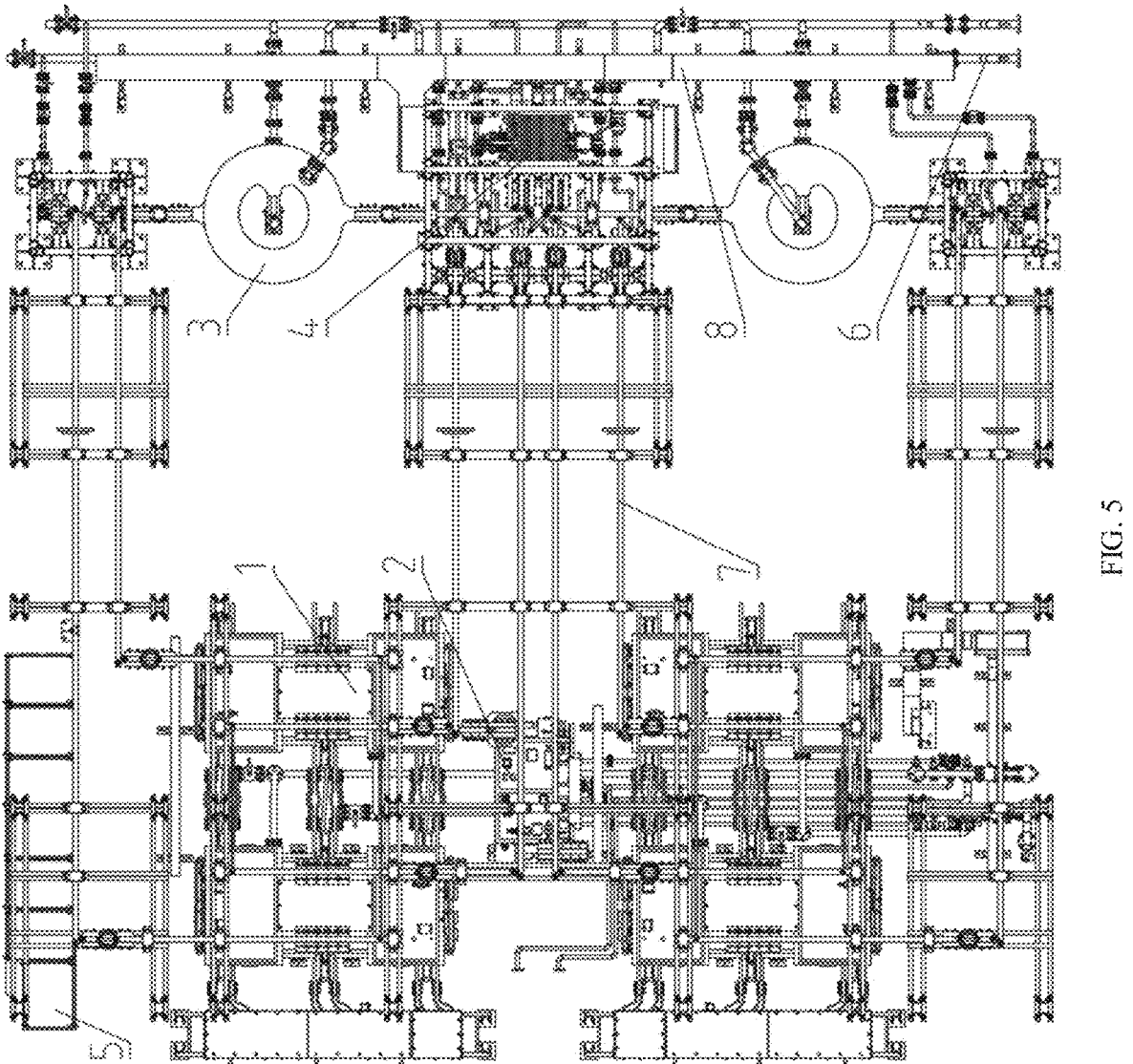
FIG. 5 is a schematic diagram from a top perspective of a DC side according to an embodiment of the present invention.

A layout of the controller 5 is as shown in FIG. 5, and a clearance distance between each control cabinet and the rectifier bridges is not less than 1 m. A 200 mm channel steel is required under the control cabinet as a bracket to facilitate electrical connections between the control cabinets.

The foregoing embodiments are used only to illustrate the technical solutions of the present invention and are not intended to be a limitation thereof; although the present invention is described in detail with reference to the foregoing embodiments, for persons of ordinary skill in the art, it shall be understood that modifications of the technical solutions recorded in the foregoing embodiments or equivalent substitutions of some of technical features therein can still be made; and all these modifications or substitutions do not make the essence of the corresponding technical solutions departed from the spirits and scope of the technical solutions in the embodiments of the present invention.

The invention claimed is:

1. A high-power four-quadrant converter system, comprising a double-secondary-side oil-immersed rectifier transformer with an output connected to four three-phase bridge type thyristor rectifiers, wherein every two rectifier bridges share a group of rectifier transformer secondary sides; wherein two rectifier bridges sharing a group of rectifier transformer secondary sides are inversely connected in parallel, one of the two rectifier bridges realizes a forward output, and the other one of the two rectifier bridges realizes a reverse output;

two groups of rectifier bridges of outputting in a same direction are configured to operate independently or in parallel; and when the two groups of rectifier bridges operate in parallel, reactors are connected in parallel to realize current sharing;

the rectifier bridges for a forward output and a reverse output realize free smooth transition under control of a controller, so that a four-quadrant operation of an output current is realized;

both an alternate current (AC) part and a direct current (DC) part are comprised, wherein the AC part comprises a high-voltage cable terminal, AC isolation switches, a lightning arrester, a rectifier transformer, an AC bus, and high-voltage buses interconnected between equipment;

an AC high-voltage cable is connected to the rectifier transformer through the cable terminal, the AC isolation switches, and the lightning arrester; wherein the cable terminal, the AC isolation switches, and the lightning arrester are mounted on a same steel structure support member, and the steel structure support member requires reliable multi-point grounding;

the DC part comprises the rectifier bridges, the reactors, the controller, and DC buses interconnected between the equipment;

the four rectifier bridges are connected to inputs of the reactors through DC water-cooling buses, and outputs of the reactors are connected in parallel and output through DC isolation switches;

the rectifier bridges comprise the two rectifier bridges sharing the rectifier transformer secondary sides, wherein one rectifier bridge is named a forward bridge for the forward output, the other rectifier bridge is named a reverse bridge for the reverse output, and the forward bridge and the reverse bridge together become a rectifier unit; and the forward bridge and the reverse bridge sharing the rectifier transformer secondary sides are not allowed to work simultaneously, and a clearance distance between the two groups of rectifier units is greater than or equal to 2 m.

2. The high-power four-quadrant converter system according to claim 1, wherein a three-phase AC bus of the AC part adopts a closed structure; and the AC bus requires a reliable electrical connection between three-phase shielding layers and single-point grounding.

3. The high-power four-quadrant converter system according to claim 1, further comprising reserved interfaces at both ends, wherein the reserved interfaces meet a scalable connection mode and serve as connection media for the AC part and the DC part.

4. The high-power four-quadrant converter system according to claim 1, further comprising a bypass cabinet used for system protection, wherein a first end of the bypass cabinet is connected to the rectifier bridges through a first soft connection, and a second end of the bypass cabinet is connected to the rectifier bridges through a second soft connection; the bypass cabinet is located in a middle of the four rectifier bridges; and a clearance from the rectifier bridges is greater than or equal to 800 mm.

5. The high-power four-quadrant converter system according to claim 1, wherein an upper reactor and a lower reactor are arranged up and down with a clearance distance greater than or equal to 800 mm, and the upper reactor is fixed to a surface of the lower reactor by using a nonmagnetic material.

6. The high-power four-quadrant converter system according to claim 1, wherein the DC isolation switches are arranged up and down with a clearance distance greater than or equal to 1.5 m; and the DC isolation switches are fixed with a steel structure.

7. The high-power four-quadrant converter system according to claim 1, wherein the DC buses are aluminum busbars with a cross-section of 200×60 mm, a middle limber hole of the aluminum busbars has a diameter of 20 mm, the aluminum busbars are fixed on a suspension beam through insulators, and the suspension beam is connected to a main steel structure through a screw.

8. The high-power four-quadrant converter system according to claim 1, wherein a clearance distance between each control cabinet and the rectifier bridges is greater than or equal to 1 m; and a 200 mm channel steel is arranged under the control cabinet as a bracket to facilitate electrical connections between the control cabinets.

\* \* \* \* \*